United States Patent
Wu et al.

(10) Patent No.: US 12,102,919 B2
(45) Date of Patent: Oct. 1, 2024

(54) METHOD FOR GAME OBJECT CONTROL IN GAME MAP, MOBILE TERMINAL, AND COMPUTER READABLE STORAGE MEDIUM

(71) Applicant: Shanghai Lilith Computer Technology CO., LTD., Shanghai (CN)

(72) Inventors: Chunhui Wu, Shanghai (CN); Qiwei Wang, Shanghai (CN)

(73) Assignee: Shanghai Lilith Technology Corporation, Shanghai (CN)

( * ) Notice: Subject to any disclaimer, the term of this patent is extended or adjusted under 35 U.S.C. 154(b) by 0 days.

(21) Appl. No.: 18/550,407

(22) PCT Filed: Dec. 20, 2021

(86) PCT No.: PCT/CN2021/139648
§ 371 (c)(1),
(2) Date: Sep. 13, 2023

(87) PCT Pub. No.: WO2022/193764
PCT Pub. Date: Sep. 22, 2022

(65) Prior Publication Data
US 2024/0157243 A1    May 16, 2024

(30) Foreign Application Priority Data
Mar. 17, 2021   (CN) .................. 202110283566.X

(51) Int. Cl.
*A63F 13/56* (2014.01)
*A63F 13/52* (2014.01)

(52) U.S. Cl.
CPC .............. *A63F 13/56* (2014.09); *A63F 13/52* (2014.09)

(58) Field of Classification Search
CPC .......... A63F 13/22; A63F 13/25; A63F 13/45; A63F 13/47; A63F 13/50; A63F 13/52;
(Continued)

(56) References Cited

U.S. PATENT DOCUMENTS 10,990,257 B2 *  4/2021  Wang ...................... A63F 13/31
2014/0132715 A1 *  5/2014  Raghoebardayal ... G06T 19/006
348/43

(Continued)

FOREIGN PATENT DOCUMENTS

CN           111437603 A        7/2020

*Primary Examiner* — Omkar A Deodhar
(74) *Attorney, Agent, or Firm* — David R. Stevens; Stevens Law Group

(57) ABSTRACT

The present application provides a method for game object control in a game map, a mobile terminal and a computer readable storage medium. The method for game object control includes: constructing a game map; creating a random path in each map layer to connect the map units within each map layer; configuring an attribute threshold value for the each map layer, wherein an attribute threshold value of a subsequent map layer is greater than or equal to an attribute threshold value of a preceding map layer; controlling a game object to move along any map unit connected on the random path from the map starting point to the jump unit in any map layer, and granting the game object an attribute bonus with an attribute point when the game object falls into the any map unit; and freely adding the attribute bonus for the game object to improve an attribute, wherein a sum of the attribute point of the attribute bonus added is less than or equal to an attribute threshold value for a current map layer. With the above technical solution, the way the game object march within the game map can be enriched and the strategy can be increased.

10 Claims, 1 Drawing Sheet

(58) Field of Classification Search
CPC ...... A63F 13/5378; A63F 13/55; A63F 13/69; A63F 13/70; A63F 13/79; A63F 13/822
See application file for complete search history.

(56) References Cited

U.S. PATENT DOCUMENTS

2016/0332074 A1\* 11/2016 Marr ................. A63F 13/55
2020/0316473 A1\* 10/2020 Qiu .................. A63F 13/56
2021/0146247 A1\* 5/2021 Wang ................ G06T 11/001

\* cited by examiner

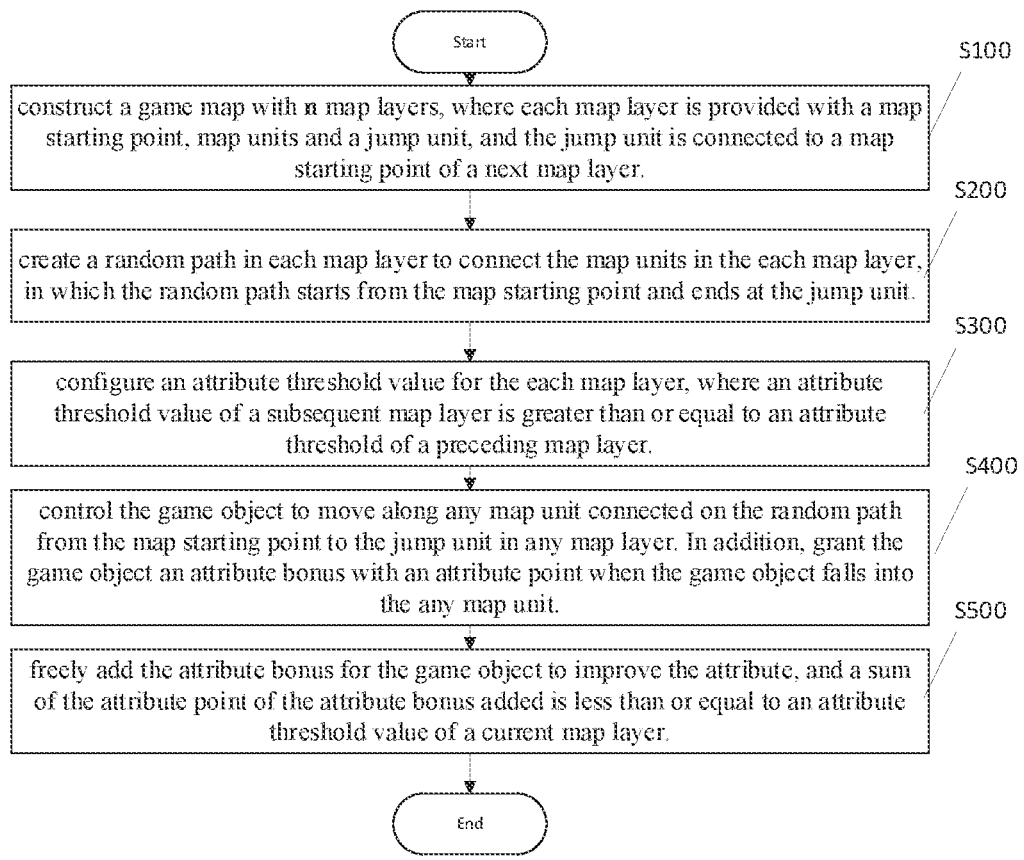

METHOD FOR GAME OBJECT CONTROL IN GAME MAP, MOBILE TERMINAL, AND COMPUTER READABLE STORAGE MEDIUM

TECHNICAL FIELD

The present application relates to a field of game control, in particular to a method for game object control in a game map, a mobile terminal and a computer readable storage medium.

BACKGROUND

Users' habits of using smart terminals for entertainment-type experiences have gradually become deeply rooted. For many game-like applications, there are maps set up within them for users to operate game objects such as heroes and vehicles. When the game objects move within the map, they may not be able to return to the map unit they have already passed, or they may be equipped by default after getting attribute bonuses within the map.

Due to the single fixed items in the game map, making the way of attribute enhancement bonus too single, no selectivity or randomness for the game players, the experience is not good.

Therefore, a new type of control is needed that can increase the randomness and strategy of attribute bonus and improve the user experience.

SUMMARY

In order to overcome the above technical defects, some objectives of the present application aim to provide a method for game object control in a game map, a mobile terminal and a computer readable storage medium, which can enrich the way the game object march within the game map and increase the strategy.

The present application discloses a method for game object control in a game map, including: constructing a game map with n map layers, wherein each map layer is provided with a map starting point, map units and a jump unit, and wherein the jump unit is connected to a map starting point of a next map layer; creating a random path in each map layer to connect the map units within the each map layer, wherein the random path starts from the map starting point and ends at the jump unit; configuring an attribute threshold value for the each map layer, wherein an attribute threshold value of a subsequent map layer is greater than or equal to an attribute threshold value of a preceding map layer; controlling a game object to move along any map unit connected on the random path from the map starting point to the jump unit in any map layer, and granting the game object an attribute bonus with an attribute point when the game object falls into the any map unit; and freely adding the attribute bonus for the game object to improve an attribute, wherein a sum of the attribute point of the attribute bonus added is less than or equal to an attribute threshold value for a current map layer.

In some embodiments, controlling the game object to move along the any map unit connected on the random path from the map starting point to the jump unit in the any map layer includes: controlling the game object to move on the random path reversibly, or to freely jump to any other map unit connected along the random path or jump to the jump unit; and freely adding the attribute bonus for the game object to improve the attribute includes: storing all of the attribute bonus that has been assigned to the game object; and adjusting adding the attribute bonus to form a new attribute bonus when the game object jumps to a new map unit.

In some embodiments, constructing the game map with n map layers, wherein each map layer is provided with the map starting point, the map unit and the jump unit, and the jump unit is connected to the map starting point of the next map layer includes: configuring one or both of an attribute bonus node and a hindrance object node for each map unit, and configuring the attribute bonus node and the hindrance object node for each jump unit, wherein the each map layer is configured with a lower limit value for the hindrance object node and a trigger threshold value for the game object to trigger with the hindrance object node, and wherein the attribute bonus node has an attribute bonus and the hindrance object node has a hindrance object; triggering the hindrance object node with the game object before the attribute bonus node when the attribute bonus node and the hindrance object node are both configured for the each map unit; and hiding the jump unit when a number of times the game object triggers with the hindrance object node in the current map layer is lower than the trigger threshold value.

In some embodiments, configuring one or both of the attribute bonus node and the hindrance object node for the each map unit includes: configuring the attribute bonus node including a first node type and a second node type, wherein the first node type and the second node type have different attribute points; freely adding the attribute bonus for the game object to improve the attribute, wherein the sum of the attribute point of the attribute bonus added is less than or equal to the attribute threshold value for the current map layer includes: calculating a difference between a number of attribute points of the attribute bonus added and the attribute threshold value at a current moment; calculating a gain weight based on: gain weight=(1+difference/attribute threshold value)*a; and calculating an overcoming gain after overcoming the hindrance object based on the gain weight when the game object jumps to the map unit configured with both the attribute bonus node and the hindrance object node.

In some embodiments, when multiple attribute bonuses of the first node type or the second node type are added for the game object, a sum of the multiple attribute bonuses of the first node type or the second node type is calculated by adding attribute points for the multiple attribute bonuses and n.

The application also discloses a mobile terminal including: a generation module, configured to construct a game map with n map layers, wherein each map layer is provided with a map starting point, map units and a jump unit, and wherein the jump unit is connected to a map starting point of a next map layer; a mapping module, configured to create a random path within each map layer to connect the map unit within the each map layer, wherein the random path starts from the map starting point and ends at the jump unit; a configuration module, configured to configure an attribute threshold value for the each map layer, wherein an attribute threshold value of a subsequent map layer is greater than or equal to an attribute threshold value of a preceding map layer; a control module, configured to receive a control command to control a game object to move along any map unit connected by the random path from the map starting point to the jump unit in any map layer, and grant the game object an attribute bonus with an attribute point when the game object falls into the any map unit; and a statistics module, configured to freely add the attribute bonus for the game object to improve the attribute, wherein a sum of the attribute point of the attribute bonus added is less than or equal to an attribute threshold value of a current map layer.

In some embodiments, the generation module configures one or both of an attribute bonus node and a hindrance object node for each map unit, and configures the attribute bonus node and the hindrance object node for each jump unit, wherein the each map layer is configured with a lower limit value for the hindrance object node and a trigger threshold value for the game object to trigger with the hindrance object node, and wherein the attribute bonus node has an attribute bonus and the hindrance object node has a hindrance object; when the attribute bonus node and the hindrance object node are both configured, the hindrance object node is triggered with the game object before the attribute bonus node; and when a number of times the game object triggers with the hindrance object node in the current map layer is lower than the trigger threshold value, the jump unit is hidden.

In some embodiments, the attribute bonus node includes a first node type and a second node type, wherein the first node type and the second node type have different attribute points; the statistical module calculates a difference between a number of attribute points of the attribute bonus added and the attribute threshold value at a current moment; a gain weight is calculated based on: gain weight=(1+difference/ attribute threshold value)*a; and an overcoming gain is calculated after overcoming the hindrance object based on the gain weight when the game object jumps to the map unit configured with both the attribute bonus node and the hindrance object node.

In some embodiments, when multiple attribute bonuses of the first node type or the second node type are added for the game object, a sum of the multiple attribute bonuses of the first node type or the second node type is calculated by adding attribute points for the multiple attribute bonuses and n.

The present application also discloses a computer readable storage medium having a computer program stored thereon, where the computer program is executed by a processor to perform any one of the above methods.

With the adoption of the above technical solutions, the following beneficial effects are achieved compared to the prior art.
1. The marching path in the game map can be in a forward direction or in a backward direction. The game player can control the game object to march in the game map in a more abundant way.
2. The game player can choose the attribute bonus freely, which greatly enriches the technical strategy.
3. To gain greater outcome, the user is empower to choose riskier ways to improve their experience.

BRIEF DESCRIPTION OF DRAWINGS

FIG. 1 shows a flow chart of a method for game object control in a game map in accordance with some embodiments of the present application.

DETAILED DESCRIPTIONS OF EMBODIMENTS

The advantages of the present application are further described below in conjunction with the accompanying drawings and specific embodiments.

Exemplary embodiments will be described herein in detail, examples of which are represented in the accompanying drawings. Where the following description relates to the accompanying drawings, the same numerals in different accompanying drawings indicate the same or similar elements unless otherwise indicated. The embodiments described in the following exemplary embodiments do not represent all embodiments that are consistent with the present disclosure. On the contrary, they are only examples of devices and methods that are consistent with some aspects of the present disclosure, as detailed in the appended claims.

The terms used in this disclosure are for the purpose of describing particular embodiments only, and are not intended to limit the disclosure. The singular forms of "a", "said" and "the" as used in this disclosure and the appended claims are also intended to include plural forms, unless the context clearly indicates other meanings. It should also be understood that the term "and/or" as used herein refers to any or all possible combinations of one or more associated listed items.

It should be understood that while the terms "first", "second", "third", and the like may be used in this disclosure to describe various types of information, such information should not be limited to these terms. These terms are used only to distinguish information of the same type from one another. For example, without departing from the scope of the present disclosure, first information may also be referred to as second information, and similarly, second information may also be referred to as first information. Depending on the context, for example, the word "if" as used herein may be interpreted as "while" or "when" or "in response to a determining".

In the description of the present application, it should be understood that the terms "longitudinal", "transverse", "up", "down", "front", "back", "left", "right", "vertical", "horizontal", "top", "bottom", "inside", "outside", and the like indicate orientation or positional relationships based on those shown in the accompanying drawings and are intended only to facilitate and simplify the description of the present application, not to indicate or imply that the device or element referred to must have a particular orientation, be constructed and operated in a particular orientation, and therefore are not to be construed as limitations of the present application.

In the description of the present application, unless otherwise specified and limited, it should be noted that the terms "mounted", "connected", "coupled" should be understood in a broad sense, for example, as a mechanical or electrical connection, or as a connection within two components, either directly or indirectly through an intermediate medium. The specific meaning of the above terms can be understood by those of ordinary skill in the art on a case-by-case basis.

In the description that follows, suffixes such as "module", "part" or "unit" are used to denote components only for the purpose of facilitating the description of the application and have no specific meaning of their own. Thus, the terms "module" and "part" may be used interchangeably.

Referring to FIG. 1, FIG. 1 shows a method of controlling a game object in accordance with some embodiments of the present application. Specifically, the method includes the following steps.

In S100, construct a game map with n map layers, where each map layer is provided with a map starting point, map units and a jump unit, and the jump unit is connected to a map starting point of a next map layer.

Within a game-like application, a game map is constructed for different game modes, such as a plot mode, an adventure mode, a bonus mode, a maze mode, and the like of a pass-type game, in which a hero, a vehicle, and other game objects move in the game map. The game map in this embodiment has n map layers. That is, the game map has multiple map layers, each of which has the map starting point, the map units and the jump unit. The game object starts moving from the map starting point and moves to all or some of the map units until it finally moves to the jump unit. The jump unit is connected to the map starting point of the next map layer, such that when moving to the jump unit, it will move to the next map layer.

It is understood that when the map layer has only one layer, the jump unit will not have the map starting point of the next map layer for connection. The game object will leave the game map when moving to the jump unit. Thus, when the map layer has multiple layers, moving to the jump unit of the last layer will also mean a trigger point for leaving the game map.

In S200, create a random path in each map layer to connect the map units in the each map layer, in which the random path starts from the map starting point and ends at the jump unit.

The random path is created to the connect map units, the map starting point and the jumping unit in the same map layer after the map layer is constructed. It is understood that the random path starts necessarily at the map starting point and ends necessarily at the jump point. During marching, all map units may be connected linearly to form a random path with only one main line, or some of the map units may be connected linearly and the remaining part of the map units may be connected non-linearly to form a dendritic random path, i.e. a random path with one main line and at least one branch line. For the game object, it may move from the map starting point to the jump unit via only the map units on the main line, or it may traverse each of the main line and the at least one branch line to go through all of the map units.

In S300, configure an attribute threshold value for the each map layer, where an attribute threshold value of a subsequent map layer is greater than or equal to an attribute threshold of a preceding map layer.

The attribute threshold value is configured for the each map layer after the each map layer has been built. For example, for a game application, an energy value, a star value, a population value, and the like of the map layer may be used as the attribute threshold value. The attribute threshold value may be used as a limit to some other values. Considering that the game object may face more difficulties when goes to deeper map layer, the attribute threshold value may be slightly open even as some kind of restriction, i.e., when configuring the attribute threshold value, an attribute threshold value of a latter map layer may be greater than or equal to an attribute threshold of a previous map layer, thus providing more room of the attribute threshold value for the game player.

In S400, control the game object to move along any map unit connected on the random path from the map starting point to the jump unit in any map layer. In addition, grant the game object an attribute bonus with an attribute point when the game object falls into the any map unit.

With the above configuration, the game object may be controlled to move in the game map based on an external operation instruction. For example, the game object enters the first map layer and lands at the map starting point of the first map layer and moves along any map unit on the random path up to the jump unit of the first map layer. It can be understood that the game object in this embodiment may move to any map unit when it moves, and there will not be a situation where the object cannot go back to the map unit that has been passed at a previous moment or the whole movement path is unidirectional mobility. For example, for almost all of the game maps in the adventure mode in the prior art, once the game object has gone through a certain map unit, the certain map unit will interact to the user in gray, indicating that it is not reversible. Compared to this approach in the prior art, the game object in this embodiment can go backwards. Once a wrong map unit is selected in a previous sequence, the user can start over and arrive at the jump unit in a different way.

The attribute bonus is preset on some of the map unit, which may adjust or enhance the game object's own attributes such as attack power, defense power, skill effect, life value, etc. Furthermore, each attribute bonus is assigned with the attribute point. When the game object falls into certain map units, the attribute bonus will be given to the game object. That is, when the game object selects the attribute bonus, its attribute will be enhanced correspondingly or get different effect enhancement. In addition, the game object also records the attribute point of the attribute bonus, as a degree of the attribute bonus given to the game object.

In S500, the game object is free to add the attribute bonus to improve the attribute, and a sum of the attribute point of the attribute bonus added is less than or equal to an attribute threshold value of a current map layer.

In some embodiments, the game object may obtain multiple attribute bonuses when falling into different map units. The attribute bonuses configured with the attribute point may be freely selected by the game object, and the attribute may be improved due to the selected attribute bonuses. Furthermore, the attribute point of the selected attribute bonuses will be summed. The sum will be compared with the attribute threshold value of the current map layer, and the sum of the attribute points will be controlled to be less than the attribute threshold value of the current map layer. In other words, the attribute threshold value of the current layer serves as an upper limit of attribute points, limiting the selectable attribute bonuses, thus giving the user a strategy for selecting attribute bonuses under restricted circumstances and improving the strategy of the game application.

In some embodiments, the step S400 of controlling the game object to move along any map unit connected on the random path from the map starting point to the jump unit in any map layer includes the following steps.

In S410, control the game object with reversible movement on the random path, or to freely jump to any other map unit connected along the random path or the jump unit.

On the random path, the game object may move at will, i.e., when the game object has moved to the certain map unit, obtained the attribute bonus on that certain map unit, and then left, the certain map unit will not be represented in grayscale and be open to the game object, making it possible for the game object to return to the certain map unit again under control. Thus, when the game object has chosen a branch path of the random path and finds that the branch path cannot continue to march (e.g., the branch is closed, or the object on the certain map unit is too strong to resist), the game object can go backwards, or freely jump to any other map unit connected on the random path or the jump unit under control. For example, when the user selects any other map unit, the game object can be controlled to move directly to the map unit that has already been experienced.

The step S500 for the game object to freely add the attribute bonus to improve the attribute includes the following steps.

In S510, store all the attribute bonuses that have been assigned to the game object.

Attribute bonuses of all map units experienced by the game object may be stored in the backend for the user to call when selecting.

In S520, when the game object jumps to a new map unit, adjust the existing attribute bonus to form a new attribute bonus.

When the game object jumps to a new map unit and resists the object on the new map unit (if any), the newly acquired attribute bonus may be stored. After the user adjusts the attribute bonus (e.g. unloads some of the assembled attribute bonuses and replaces them with the newly acquired attribute bonus), the new attribute bonus is formed, thus granting the user the ability to adjust the attribute bonuses assembled after each move of the game object.

In some embodiments, the step S100 of constructing the game map having n map layers, where each map layer is provided with the map starting point, the map units and the jump unit, and the jump unit is connected to the map starting point of the next map layer includes the following steps.

In S110, configure one or both of an attribute bonus node and a hindrance object node for each map unit, and configure the attribute bonus node and the hindrance object node for each jump unit, where the each map layer is configured with a lower limit value for the hindrance object node and a trigger threshold value for the game object to trigger with the hindrance object node, and where the attribute bonus node has an attribute bonus and the hindrance object node has a hindrance object.

The map unit may be classified. For example, the map unit may be classified into the unit with the attribute bonus node or the unit with the hindrance node, or with both types of nodes. The attribute bonus node and the hindrance object node are configured for each jump unit to achieve the classification of the map unit. For example, if the map unit is classified with the attribute bonus node only, it means that when the game object moves to the map unit, the game object may directly get the attribute bonus on the map unit. If the map unit is classified with the hindrance object node only, it means that when the game object moves to the map unit, the game object needs to resist the hindrance object on the hindrance object node. If the game object fails in the resistance, it cannot continue to advance in the game map.

Each map layer is configured with the lower limit value of the hindrance object node and the trigger threshold value for the game object to trigger with the hindrance object node, indicating a minimum value of the hindrance object node that each map layer should have to give the user a certain difficulty in marching, and a minimum number of times the game object triggers with the hindrance object node to prevent the user from bypassing all hindrance object nodes.

In S120, when the attribute bonus node and the hindrance object node are both configured, the hindrance object node is triggered with the game object before the attribute bonus node.

When the map unit is classified with both the attribute bonus node and the hindrance object node, it means that when the game object moves to the map unit, the game object may obtain the attribute bonus after resisting with the hindrance object on the hindrance object node and resists successfully.

In S130, hide the jump unit when the number of times the game object triggers with the hindrance object node in the current map layer is lower than the trigger threshold value.

The game map is also configured such that the jump unit may only appear when the number of the game object triggers with the hindrance object node in the current map layer exceeds the trigger threshold value, thus giving a certain difficulty of the game map. It requires the user to resist at least some hindrance objects and provides a certain strategic resistance situation, thus requiring the user to propose a corresponding method.

Further, the step S110 of configuring one or both of the attribute bonus node and the hindrance object node for each map unit includes the following steps.

In S111, the attribute bonus node includes a first node type and a second node type, where the first node type and the second node type have different attribute points.

The attribute bonus node may be further classified. For example, the attribute bonus node may be classified at least including the first node type and the second node type. The difference between the two types is that the first node type and the second node type have different attribute points. For example, some attribute bonuses with a higher degree of attribute bonus are recorded of the first node type, which has 2 attribute points, and other attribute bonuses with a lower degree of attribute bonuses are recorded with the second node type, which has 1 attribute point. The first node type, which has 2 attribute points, may also be recorded for some special scenarios with attribute bonuses that are particularly important, such as racial restraint, the ability to be reborn, etc.

The step S500 for the game object to freely add the attribute bonus to improve the attribute, and the sum of the attribute point of the attribute bonuses added is less than or equal to the attribute threshold value of the current map layer includes the following steps.

In S510, calculate a difference between a number of attribute points of the added attribute bonus and the attribute threshold value at the current moment.

In order to further improve the way the game object is controlled in the game map, there will be configured a mechanism in the game-like application in which the less attribute bonuses are selected, the higher the gain is obtained. Specifically, the difference between the number of attribute points that the added attribute bonus and the attribute threshold value at the current moment will be calculated, i.e., if the attribute bonus is not configured to reach the up limit, the attribute threshold value is greater than the sum of attribute points that the attribute bonuses have.

In S520, calculate a gain weight based on: gain weight= (1+difference/attribute threshold value)*a.

The value of a in the above formula may be freely adjusted, for example, 1, 1.15, 1.5, etc., depending on the difficulty to the game map. Taking a=1.15 as an example, when the attribute threshold value of this map layer is 6, and the user only configures attribute bonuses with a total of 4 attribute points (for example, 4 attribute bonuses, each of which with 1 attribute point), although the attribute bonus is lower and the game object is improved less, but it can still resist the hindrance object under the user's operation. It should be given a higher gain with a gain weight of (1+2/6)*1.15≈1.53, then 1.53 times the original gain can be obtained.

In S530, when the game object jumps to the map unit configured with both the attribute bonus node and the hindrance object node, an overcoming gain after overcoming the hindrance object is calculated based on the gain weight.

In some embodiments, when the gain weight is calculated, the gain weight may be refreshed before the game object needs to resist the hindrance object. Thus, when the game object jumps to the map unit configured with both the attribute bonus node and the hindrance object node, the overcoming gain after overcoming the hindrance object is calculated based on the gain weight. Through the above configuration, the strategy of the game object is further improved to meet a game experience of "the higher the risk, the higher the reward".

In some embodiments, other strategies are further configured. For example, the types of attribute bonuses can be diversified. When the game object is added with multiple attribute bonuses on the first node type or the second node type, for example, all the added attribute bonuses are of the same type, or attribute bonuses with correlation (only in the case where multiple attribute bonuses can be configured at the same time to play a higher degree of bonuses), the sum of attribute points for the added attribute bonus is calculated plus n, for example, n may be equal to 1 or 2, which makes it more difficult for users to freely select the attribute bonus. It is more strategic for the user to contribute intellectual work to select the attribute bonus specifically.

The present disclosure also discloses a mobile terminal including: a generation module configured to construct a game map with n map layers, where each map layer is provided with a map start point, map units and a jump unit, and the jump unit is connected to a map starting point of a next map layer; a drawing module configured to create a random path in each map layer to connect the map units in the each map layer, in which the random path starts from the map starting point and ends at the jump unit; a configuration module configured to configure an attribute threshold value for the each map layer, where an attribute threshold value of a subsequent map layer is greater than or equal to an attribute threshold of a preceding map layer; a control module configured to receive a control command to control a game object to move along any map unit connected by the random path from the map starting point to the jump unit in any map layer, and give the game object an attribute bonus with an attribute point when the game object falls into the any map unit; and a statistics module configured to freely add the attribute bonus for the game object to improve the attribute, where a sum of the attribute point of the attribute bonus added is less than or equal to the attribute threshold value of the current map layer.

In some embodiments, the generation module may configure one or both of an attribute bonus node and a hindrance object node for each map unit, and may configure the attribute bonus node and the hindrance object node for each jump unit, where the each map layer is configured with a lower limit value for the hindrance object node and a trigger threshold value for the game object to trigger with the hindrance object node, and where the attribute bonus node has an attribute bonus and the hindrance object node has a hindrance object. When the attribute bonus node and the hindrance object node are both configured, the hindrance object node is triggered with the game object before the attribute bonus node. When the number of times the game object triggers with the hindrance object node in the current map layer is lower than the trigger threshold value, the jump unit may be hidden.

In some embodiments, the attribute bonus node includes a first node type and a second node type, where the first node type and the second node type have different attribute points. The statistical module may calculate the difference between the number of attribute points of the added attribute bonus and the attribute threshold value at the current moment. The statistical module may calculate a gain weight based on: gain weight=(1+difference/attribute threshold value)*a. When the game object jumps to the map unit configured with both the attribute bonus node and the hindrance object node, the statistical module may calculate an overcoming gain after overcoming the hindrance object based on the gain weight.

In some embodiments, when multiple attribute bonuses of the first node type or the second node type are added for the game object, a sum of the multiple attribute bonuses of the first node type or the second node type is calculated by adding attribute points for the multiple attribute bonuses and n.

The present application also discloses a computer readable storage medium having a computer program stored thereon, the computer program being executed by a processor to implement the steps of the game object control method as described above.

Mobile terminals can be implemented in various forms. For example, the terminals described in the present application may include mobile terminals such as cell phones, smart phones, laptops, PDAs (personal digital assistants), PADs (tablet computers), PMPs (portable multimedia players), navigation devices, and the like, as well as fixed terminals such as digital TVs, desktop computers, and the like. In the following, it is assumed that the terminal is a mobile terminal. However, it will be understood by those skilled in the art that the construction according to some embodiments of the present application may also be applied to fixed type terminals, in addition to components used especially for mobile purposes.

It should be noted that the embodiments of the present application have a better implementation and are not a limitation of the present application in any form. Any person skilled in the art may use the technical contents revealed above to change or modify them into equivalent valid embodiments, but any modification or equivalent changes and modifications made to the above embodiments according to the technical substance of the present application, without departing from the content of the technical solution of the present application, still fall within the technical solution of the present application.

What is claimed is:

1. A method for game object control in a game map, comprising:
   constructing a game map with n map layers, wherein each map layer is provided with a map starting point, map units and a jump unit, and wherein the jump unit is connected to a map starting point of a next map layer;
   creating a random path in each map layer to connect the map units within the each map layer, wherein the random path starts from the map starting point and ends at the jump unit;
   configuring an attribute threshold value for the each map layer, wherein an attribute threshold value of a subsequent map layer is greater than or equal to an attribute threshold value of a preceding map layer;
   controlling a game object to move along any map unit connected on the random path from the map starting point to the jump unit in any map layer, and granting the game object an attribute bonus with an attribute point when the game object falls into the any map unit; and
   freely adding the attribute bonus for the game object to improve an attribute, wherein a sum of the attribute point of the attribute bonus added is less than or equal to an attribute threshold value for a current map layer.

2. The method for game object control according to claim 1, wherein controlling the game object to move along the any map unit connected on the random path from the map starting point to the jump unit in the any map layer includes:
  controlling the game object to move on the random path reversibly, or to freely jump to any other map unit connected along the random path or jump to the jump unit; and
freely adding the attribute bonus for the game object to improve the attribute includes:
  storing all of the attribute bonus that has been assigned to the game object; and
  adjusting adding the attribute bonus to form a new attribute bonus when the game object jumps to a new map unit.

3. The method for game object control according to claim 1, wherein
constructing the game map with n map layers, wherein each map layer is provided with the map starting point, the map units and the jump unit, and the jump unit is connected to the map starting point of the next map layer includes:
  configuring one or both of an attribute bonus node and a hindrance object node for each map unit, and configuring the attribute bonus node and the hindrance object node for each jump unit, wherein the each map layer is configured with a lower limit value for the hindrance object node and a trigger threshold value for the game object to trigger with the hindrance object node, and wherein the attribute bonus node has an attribute bonus and the hindrance object node has a hindrance object;
  triggering the hindrance object node with the game object before the attribute bonus node when the attribute bonus node and the hindrance object node are both configured for the each map unit; and
  hiding the jump unit when a number of times the game object triggers with the hindrance object node in the current map layer is lower than the trigger threshold value.

4. The method for game object control according to claim 3, wherein
configuring one or both of the attribute bonus node and the hindrance object node for the each map unit includes:
  configuring the attribute bonus node including a first node type and a second node type, wherein the first node type and the second node type have different attribute points;
freely adding the attribute bonus for the game object to improve the attribute, wherein the sum of the attribute point of the attribute bonus added is less than or equal to the attribute threshold value for the current map layer includes:
  calculating a difference between a number of attribute points of the attribute bonus added and the attribute threshold value at a current moment;
  calculating a gain weight based on: gain weight=(1+difference/attribute threshold value)*a; and
  calculating an overcoming gain after overcoming the hindrance object based on the gain weight when the game object jumps to the map unit configured with both the attribute bonus node and the hindrance object node.

5. The method for game object control according to claim 4, wherein when multiple attribute bonuses of the first node type or the second node type are added for the game object, a sum of the multiple attribute bonuses of the first node type or the second node type is calculated by adding attribute points for the multiple attribute bonuses and n.

6. A mobile terminal, comprising:
a generation module, configured to construct a game map with n map layers, wherein each map layer is provided with a map starting point, map units and a jump unit, and wherein the jump unit is connected to a map starting point of a next map layer;
a mapping module, configured to create a random path within each map layer to connect the map units within the each map layer, wherein the random path starts from the map starting point and ends at the jump unit;
a configuration module, configured to configure an attribute threshold value for the each map layer, wherein an attribute threshold value of a subsequent map layer is greater than or equal to an attribute threshold value of a preceding map layer;
a control module, configured to receive a control command to control a game object to move along any map unit connected by the random path from the map starting point to the jump unit in any map layer, and grant the game object an attribute bonus with an attribute point when the game object falls into the any map unit; and
a statistics module, configured to freely add the attribute bonus for the game object to improve the attribute, wherein a sum of the attribute point of the attribute bonus added is less than or equal to an attribute threshold value of a current map layer.

7. The mobile terminal according to claim 6, wherein
the generation module configures one or both of an attribute bonus node and a hindrance object node for each map unit, and configures the attribute bonus node and the hindrance object node for each jump unit, wherein the each map layer is configured with a lower limit value for the hindrance object node and a trigger threshold value for the game object to trigger with the hindrance object node, and wherein the attribute bonus node has an attribute bonus and the hindrance object node has a hindrance object;
when the attribute bonus node and the hindrance object node are both configured, the hindrance object node is triggered with the game object before the attribute bonus node; and
when a number of times the game object triggers with the hindrance object node in the current map layer is lower than the trigger threshold value, the jump unit is hidden.

8. The mobile terminal according to claim 7, wherein
the attribute bonus node includes a first node type and a second node type, wherein the first node type and the second node type have different attribute points;
the statistical module calculates a difference between a number of attribute points of the attribute bonus added and the attribute threshold value at a current moment;
a gain weight is calculated based on: gain weight=(1+difference/attribute threshold value) a; and
an overcoming gain is calculated after overcoming the hindrance object based on the gain weight when the game object jumps to the map unit configured with both the attribute bonus node and the hindrance object node.

9. The mobile terminal according to claim 8, wherein when multiple attribute bonuses of the first node type or the second node type are added for the game object, a sum of the multiple attribute bonuses of the first node type or the second node type is calculated by adding attribute points for the multiple attribute bonuses and n.

10. A non-transitory computer-readable storage medium having a computer program stored thereon, wherein the computer program is executed by a processor to perform the method of any one of claims 1-5.

\* \* \* \* \*